United States Patent

Cullen

[15] 3,659,372
[45] May 2, 1972

[54] SINKER RELEASE METHOD AND APPARATUS

[72] Inventor: Robert E. Cullen, 15806 Presswick Lane, Bowie, Md. 20715

[22] Filed: Jan. 29, 1971

[21] Appl. No.: 111,056

[52] U.S. Cl. .................................... 43/44.88, 43/44.91
[51] Int. Cl. ............................................. A01k 95/00
[58] Field of Search ............................. 43/44.88, 44.91

[56] References Cited

UNITED STATES PATENTS

| 250,848 | 12/1881 | Smith | 43/44.88 |
| 2,052,262 | 8/1936 | Walberg | 43/44.88 |
| 2,177,007 | 10/1939 | Smith | 43/44.88 |
| 3,455,056 | 7/1969 | Cultrera | 43/44.91 |

Primary Examiner—Samuel Koren
Assistant Examiner—Daniel L. Leach
Attorney—Jess Joseph Smith, Jr.

[57] ABSTRACT

A fishing apparatus attachable to and moveable along a fishing line so as to provide a recoverable sinker release that is operative when retrieving a catch. A fishing line with a swivel connecting a leader and bait or lure is threaded through two concentric, interlocking, cylindrically shaped members, the inner one of which is provided with an attaching means for carrying various sized sinkers. The concentric members are locked together in use by a spring extending through an opening in the inner member to rest against said swivel. As a catch is retrieved, the outer concentric member contacts the tip of a fishing rod or pole and disengages said spring from contact with the swivel, thereby permitting said catch to be retrieved.

13 Claims, 5 Drawing Figures

PATENTED MAY 2 1972 3,659,372
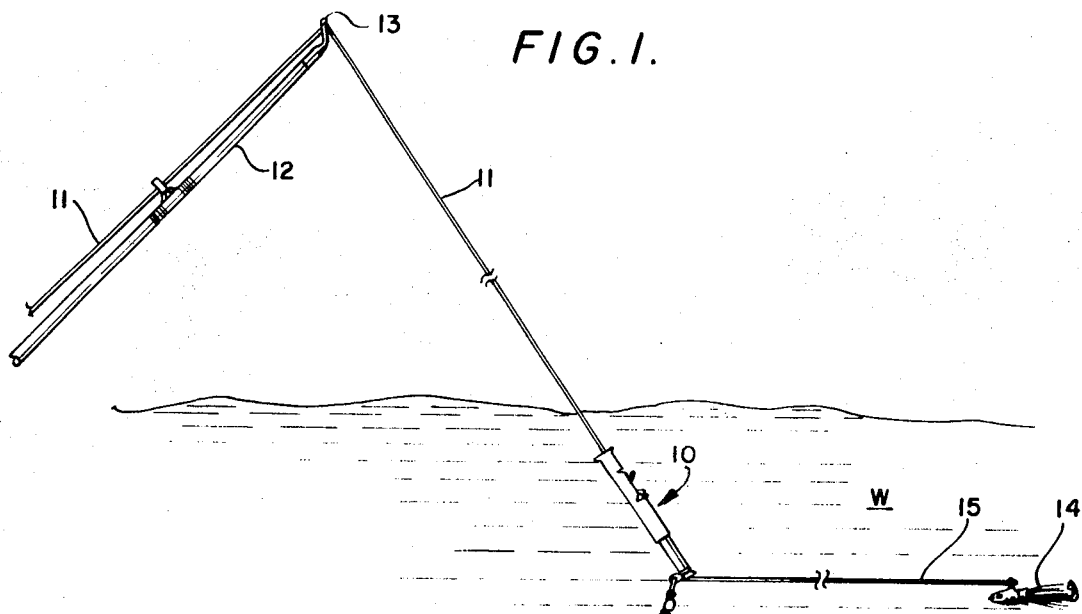
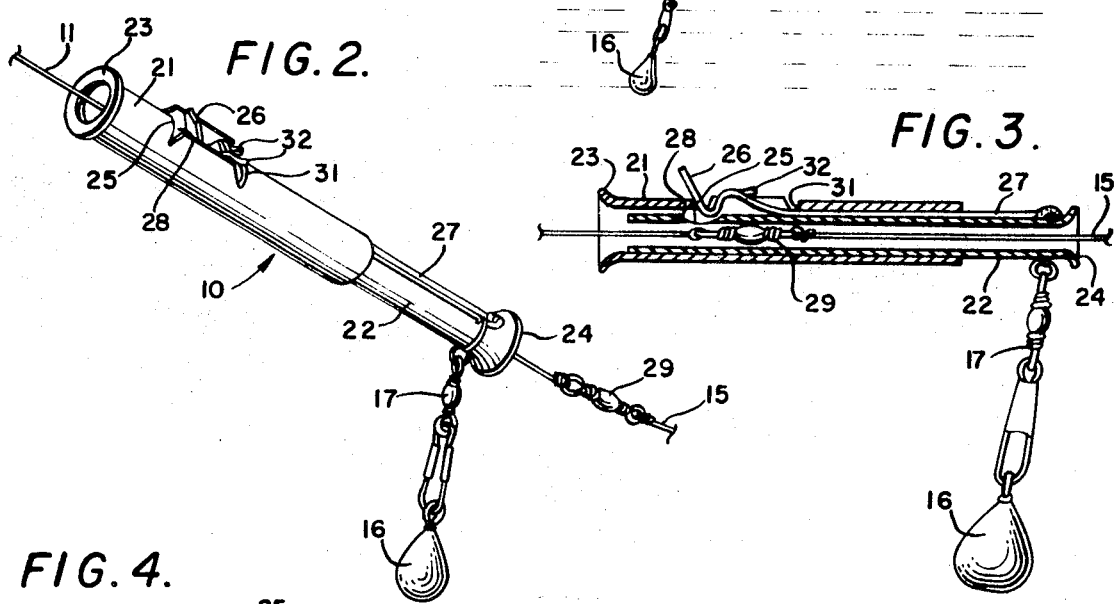
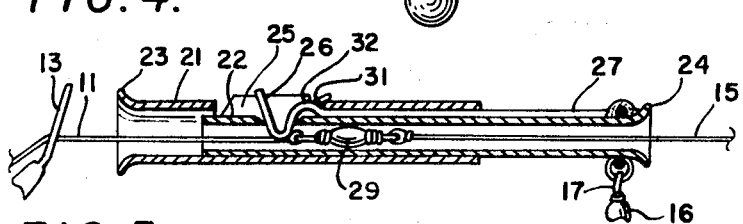
INVENTOR
ROBERT E. CULLEN
BY Jess J. Smith, Jr.
ATTORNEY 3,659,372

SINKER RELEASE METHOD AND APPARATUS

BACKGROUND & SUMMARY OF THE INVENTION

This invention relates to a fishing method and apparatus particularly useful in trolling where the bait or lure is placed at the end of the fishing line and spaced some distance from the sinker. More particularly, this invention is concerned with a retrievable sinker release apparatus attachable to and usable on fishing lines to promote control of the line and capture of the fish.

Trolling is a term used to describe a technique of fishing in which the bait or lure is towed through the water behind a moving boat. Such a technique is frequently employed where large bodies of water are to be fished and is particularly successful for game fishing. Generally, a sinker is attached to the fishing line to place the bait or lure at a desired depth with the size of the sinker varying in relation to the trolling speed and desired depth. A heavier sinker is generally used for a relatively fast trolling speed and/or a greater depth. Inasmuch as there is a relatively great amount of leader between the sinker and the lure or bait it is only possible to retrieve, or reel in, the line until the sinker strikes the tip of the pole or rod thereby preventing the convenient retrieving of the remainder of the fishing line or leader and the catch. The fisherman would then have to manually haul the fish in, thereby exerting extra energy, unnecessarily consuming time, possibly losing the fish, entangling his leader where it has fallen to the deck. It is to this aspect of trolling or fishing that the instant invention is directed, that is, a method and apparatus for providing a retrievable sinker or weight release that permits the fisherman to readily adjust the size of the sinker, the length of leader between sinker and the bait or lure, and to enable the fisherman to release such sinker when retrieving a catch with the apparatus sliding along the fishing line to the catch and thereby enabling the fisherman to conveniently retrieve his catch and his sinker by reeling in the entire length of the fishing line including the leader.

Various other type sinker or weight releases have been constructed but none seem to be as effective, simple in use, or as inexpensive as herein described. One type such device is used by threading the fishing line through the sinker itself with a short section of light-bulb chain joining the fishing line with the leader at the location where the weight is locked into engagement with the fishing line by means of a pivoted sprocket that meshes with the chain thereby holding the fishing line and weight together. When a fish is hooked, the pivoted sprocket releases the chain and the weight slides along the line to the bait. One obvious disadvantage of such device is that the weight is often released prematurely when any object, including the bottom, hits the bait. Another disadvantage is the necessity to cut the fishing line to re-thread it through a heavier weight or when changing leader. Another such device is that shown in U.S. Pat. No. 2,654,177. The principal disadvantage of this device is that the weight is prematurely released by an unintended jerk of the pole. Other disadvantages include the inability to use varying size weights and the dependence upon a frictional engagement between the fishing line and the weight without a positive lock between the two.

It is one of the principal objects of the invention to provide a method and apparatus useful in trolling or fishing to enable a fisherman to secure a sinker on his line some distance from the bait or lure and to release said sinker when retrieving the catch thereby enabling the fisherman to reel his catch and the sinker into his boat or other platform.

It is a further object of this invention to provide a novel fishing line attachment that readily permits the use and exchange of varying sized or lengths of leader.

It is a further object of this invention to provide a fishing device that permits the rapid exchange or replacement of varying sized sinkers or weights.

It is a further object of this invention to provide a fishing line attachment that is useful for catching all types of fish and is useful with all types of fishing techniques including casting, spinning, and trolling.

It is a further object of this invention to provide a fishing apparatus that is so designed as to provide for a damping or a force-absorbing or bypass means so that a tender-mouthed fish will not be pulling against the entire weight of the sinker and thereby have the hook jerked from its tender mouth.

It is a further object of this invention to provide a fishing line attachment that is simple in operation, inexpensive to manufacture, and effective in use.

BRIEF DESCRIPTION OF DRAWINGS

The exact nature of this invention as well as other objects and advantages thereof will be readily apparent from consideration of the following specification, relating to the annexed drawings in which:

FIG. 1 is a view of the fishing apparatus of the invention showing the sinker release in the water as used when trolling.

FIG. 2 is a perspective view of the preferred embodiment of the invention with sinker attached.

FIG. 3 is a longitudinal sectional view of the preferred embodiment of FIG. 2 showing the sinker release in the unlocked position.

FIG. 4 is a longitudinal sectional view of the preferred embodiment of FIG. 2 showing the sinker release in the locked position.

FIG. 5 is a longitudinal sectional view of a modification of the preferred embodiment showing the sinker release in the locked position.

DETAILED DESCRIPTION OF THE INVENTION

Referring now to the drawings, wherein like reference characters designate like or corresponding parts throughout the several views, there is shown in FIG. 1 the sinker release 10 of the instant invention being used by trolling in water W. Fishing line 11 emanates from rod or pole 12 and through eye 13 in the end of said pole 12. The line 11 then is threaded through release 10 and onto the bait or lure 14. That section of fishing line 11 from the release 10 to the bait 14 is referred to as leader 15. It should be noted that any minimum or discharged suitable fishing line 11 may be employed and such fishing line 11 or leader 15 may be of any desired length, weight, or suitable composition with leader 15 generally being longer than approximately 6 to 8 feet.

Suspended down from the lower end of release 10 is the weight or sinker 16. It can be seen from FIG. 1 that the release 10 places the sinker close to the bottom of the body of water with the bait 14 flowing backward therefrom and likewise along the bottom. Although FIG. 1 shows the bait 14 slightly below release 10, the lure or bait 14 might be oscillating or gently and randomly floating in the water above, below, or at the same depth as release 10 depending upon the hydrodynamic shape that the bait 14 presents to the medium through which it is travelling, water W. Likewise, the trolling speed affects the depth, sinker weight, etc., as aforementioned. There are other techniques in trolling, for example, by exchanging the relative positions of the release 10 and lure 14 as they are shown in FIG. 1, but that arrangement does not permit the fisherman to effectively fish as close to the bottom as the preferred embodiment shown in FIG. 1. Further, the other arrangement would tend to drag the weight along the bottom thereby frightening the fish away from the area.

There is shown in FIG. 2 a perspective view of the sinker release 10 having an outer cylindrical member 21 and an inner cylindrical member 22 that slides within said outer member 21. Each of the members 21 and 22 has flared ends 23 and 24 respectively, so that the line 11 will not be cut or worn by rubbing or binding thereagainst. Outer member 21 is provided with a cut-out 25 for receiving V-shaped spring 26 that is fixedly attached to inner member 22 along its lower end as shown in FIG. 2, or at 27. Inner member 22 is provided with a cut-out 28 so that spring 26 may fit therein and thereby partially reduce the inner diameter of such inner member 22. Sinker 16 is suspended from the lower end of inner member 22 by means of a snap swivel 17 or other suitable attaching means for rapidly changing weights.

In use, line 11 is threaded through outer and inner members 21 and 22. Joining line 11 and leader 15 is the swivel 29. Swivel 29 may be any type of connecting and swivelling member and may be provided with a snap or other quick release means to facilitate changing to various diameter or length leader, bait, and/or lures. It is frequently desirable to employ a leader 15 of 40 feet or greater in length. Outer and inner members 21 and 22 are then moved relative to each other by grasping flares 23 and 24 and pulling apart. Spring 26 is then forced down into cut-out 28 by means of its engagement with outer member 21 at point 31 thereby effectively reducing the diameter of inner member 22 and preventing swivel 29 from passing therethrough, as will be more easily understood after consideration of FIGS. 3 and 4. Stops 32 keep the members 21 and 22 from being pulled apart when spring 26 is being actuated. The fishing apparatus is then placed in the water where sinker release 10 is supported by the V-shaped spring 26 riding against swivel 29. When it is desired to reel in the catch, the sinker release 10 continues to ride on swivel 29 until the eye 13 of pole or rod 12 contacts flange 23, with continued reeling-in disengaging spring 26 and permitting release 10 with attached weight 16 to slide to the end of leader 15 thereby permitting the fisherman to land his catch.

There is shown in FIGS. 3 and 4 longitudinal cross-sections of weight release 10 showing the relative position of outer and inner members 21 and 22 in the unlocked position in FIG. 3 and the locked position in FIG. 4. It can be seen from FIG. 3 that swivel 29 easily passes through inner member 22 as the line is being threaded. When the swivel 29 passes spring 26, it is desirable to lock the sinker release 10 by grasping the flanges 23 and 24, as aforesaid, and thereby locking the sinker release as shown in FIG. 4. It can easily be seen from FIGS. 3 and 4 that, by pulling the ends of members 21 and 22, and sliding them relative to each other the V-shaped portion of spring 26 is forced down into cut-out 28 as spring 26 slides along point 31 of the outer member 21. Thus, the inner diameter of inner member 22 is greatly reduced so that swivel 29 cannot now slide therethrough. In use, the V-shaped portion of spring 26 rests upon swivel 29 thereby insuring that release 10, and weight 16 that is carried by release 10, remains at its desired position, that is, where swivel 19 joins line 11 with leader 15. When it is desired to retrieve the catch, line 11 is reeled in until flange 23 contacts eye 13. At this point, further reeling in of line 11 acts to move the inner member 22 toward eye 13. This can be easily seen from FIG. 4 where swivel 29 is shown engaged by the V-shaped portion of spring 26 and unable to travel closer to eye 13. As the inner member moves toward eye 13 as line 11 is reeled-in, spring 26 moves out of cut-out 28 thereby allowing the sinker release 10 to fall past swivel 29 and along line 11 to bait 14, thereby permitting the catch to be retrieved along with the sinker.

There is shown in FIG. 5 an alternative form or modification of the preferred embodiment of the instant invention wherein sinker release 50 is composed of outer and inner cylindrically shaped members 51 and 52 which are each provided with flanges 53 and 54, respectively, and sinker 16 is attached to inner member 52. Cut-outs 55 and 58 are provided in members 51 and 52 with cut-out 58 providing for the receipt of spring 56 as the two members 51 and 52 are moved relative to each other and with one end of spring 56 engaging flange 61 of outer member 51 and the other end of spring 56 being attached to inner member 52 at point 57. In the locked position shown, swivel 29 is unable to pass completely through inner member 51, thereby supporting the sinker release 50 until the device is unlocked as hereinabove described with respect to the preferred embodiment.

It should be pointed out that the sinker release of this invention may be constructed of any suitable material including metals and plastics. Likewise, it should be pointed out that the method and apparatus of this invention may be practiced using various fishing techniques other than trolling and that it may be employed at any desired depth in salt or fresh water. When both the preferred embodiment and the modification are in use, as best shown in FIG. 1, it will be noted that a jerk, strike, or pull at the bait 14, or by a tender-mouthed fish, will have the effect of straightening the line 11 and the leader 15. That is, the net effect of such a jerk, strike, or pull is to move the weight 16 of release 10 toward the surface of water W, thereby providing a damping or force-absorbing means so that the tender-mouthed fish will not have the hook jerked from its mouth as it might if it were pulling directly against the mass of weight 16 and release 10.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A method of recovering a releasable sinker when retrieving a catch, comprising the steps of:
    threading a line from a fishing rod and through two concentric members the inner one of which is provided with an attaching means for carrying various sized sinkers, said line having connecting means for attaching a leader to said line;
    locking said concentric members together by releasable line holding means attached to the inner member and in such a manner as to prevent said connecting means from passing therethrough;
    reeling in said line and sinker until the outer member contacts the tip of said fishing rod and thereby unlocking said inner and outer members and releasing said line holding means thereby permitting said sinker to travel to the end of said leader and thereby permitting said catch and sinker to be retrieved.

2. The method of recovering a releasable sinker according to claim 1, and further comprising that the step of locking includes:
    moving said members relative to one another along their common axis in such a manner that they are held in frictional engagement.

3. A fishing apparatus attachable to and moveable along a fishing line so as to provide a recoverable sinker release that is operative when retrieving a catch, comprising:
    a hollow inner member for receiving a fishing line, said fishing line being threaded from a rod and through said inner member, said line having connecting means for attaching a leader to said line;
    a hollow outer member spaced concentrically with respect to said inner member;
    means attached to said inner member for carrying various sized sinkers, and;
    means attached to said inner member for releasably locking said members and including means for preventing said connecting means from passing through said inner member whereby said apparatus is supported by said connecting means and said locking means is unlocked upon contact with said rod when reeling-in said catch thereby permitting recovery of said apparatus and said catch.

4. The apparatus of claim 3, and further comprising that:
    said locking means comprises a spring attached to said inner member, said locking means being actuated manually by frictional contact with said outer member and being released by contact of said outer member with said rod as said line is being retrieved.

5. A device for recovering a releasable sinker when retrieving a catch, comprising:
    an outer member;
    an inner member disposed concentrically with respect to said outer member;
    means attached to said inner member for carrying various sized weights;

means for releasably locking said members in a relatively fixed relationship, and;

means secured to said inner member for releasably maintaining said device at a relatively fixed distance from a lure carried on a fishing line threaded through said inner member whereby said means for locking and said means secured to the inner member are released when said catch is retrieved and said outer member engages a rod tip thereby permitting said sinker to slide to said catch and be retrieved therewith.

6. The device according to claim 5, and further comprising that:

said means for releasably locking said members in a relatively fixed position comprises a spring attached to said inner member, said spring locking and unlocking said members by relative movement of said members.

7. The device according to claim 6 and further comprising that:

said inner member contains an orifice;

said spring is forced into and out of said orifice upon relative movement of said members, said spring providing frictional engagement with said fishing line when in said locking position and thereby forming said maintaining means.

8. A fishing apparatus attachable to and moveable along a fishing line so as to provide a recoverable sinker release that is operative when retrieving a catch, comprising:

an inner member for receiving a fishing line;

an outer member spaced concentrically with respect to said inner member;

means connected to said inner member for carrying various sized weights, and;

means for locking and unlocking said members upon relative movement between said members and including a releasable line holding means attached to the inner member whereby said members may be locked at a predetermined distance from a lure carried by said fishing line and may be unlocked by relative movement of said members upon retrieving said catch as said apparatus contacts the tip of a fishing rod thereby permitting said apparatus to be retrieved along with said catch.

9. The apparatus according to claim 8, and further comprising that:

said locking and unlocking means and line holding means comprises a spring attached to said inner member.

10. The apparatus according to claim 9, and further comprising that:

said members are hollow and cylindrical in shape.

11. The apparatus according to claim 10, and further comprising that:

said members contain openings, and;

said spring protrudes through said openings and into said inner member thereby decreasing the diameter of said hollow, inner cylindrical member in such a manner as to maintain said apparatus at said predetermined distance from said lure.

12. The apparatus according to claim 8, and further comprising that:

said members have flared ends so as to prevent said fishing line from being cut thereon.

13. The apparatus according to claim 9, and further comprising that:

said spring includes means for stopping relative movement between said members.

* * * * *